J. HAGEN.
Corn-Planter.
No. 217,940.  Patented July 29, 1879.
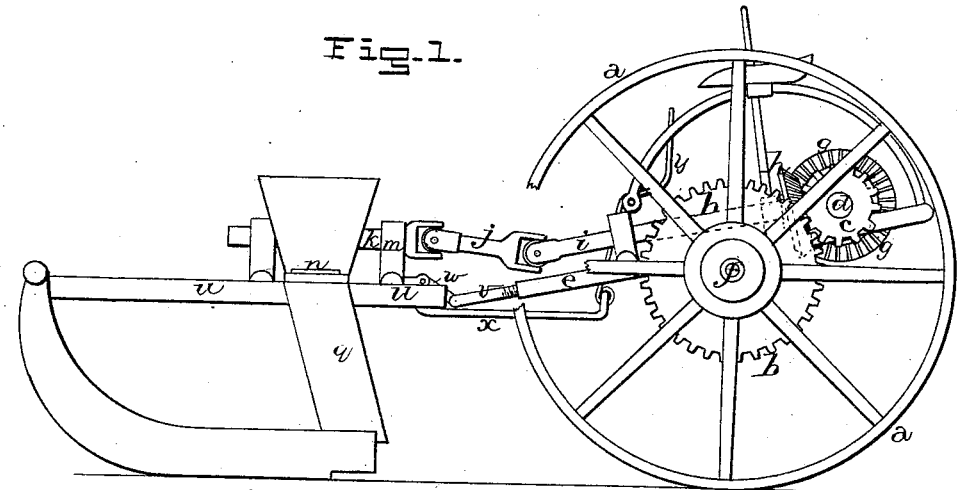
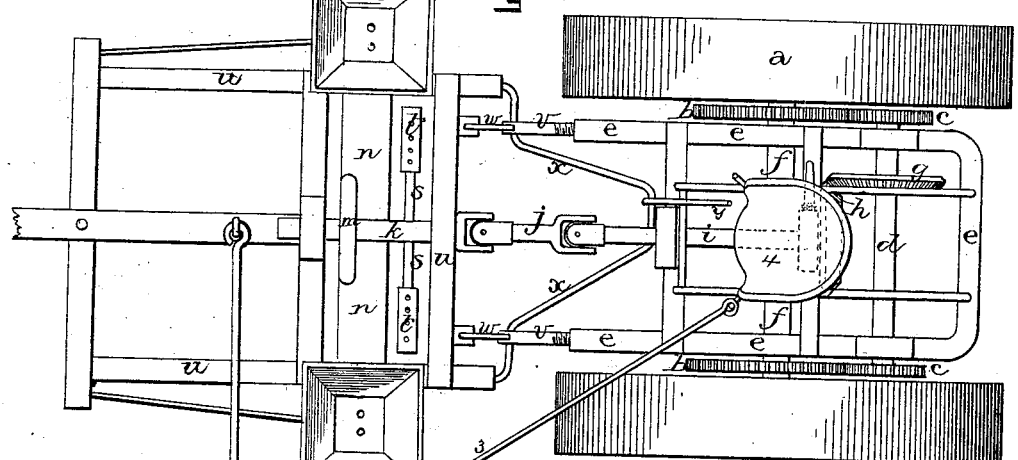
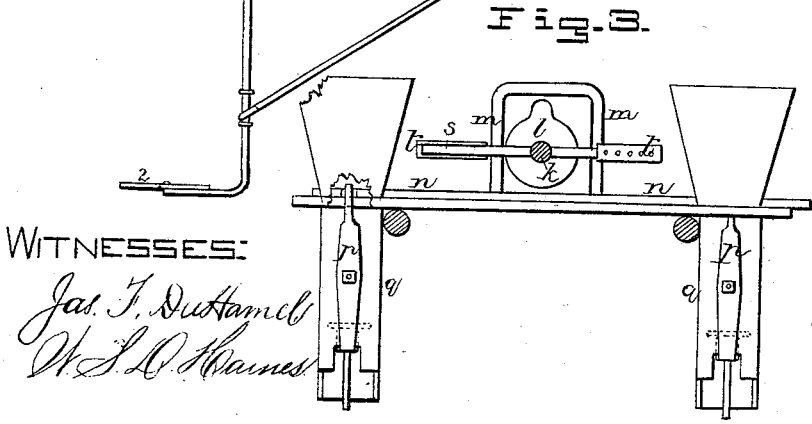
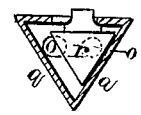

UNITED STATES PATENT OFFICE.

JOHN HAGEN, OF LITTLE SIOUX, IOWA.

IMPROVEMENT IN CORN-PLANTERS.

Specification forming part of Letters Patent No. 217,940, dated July 29, 1879; application filed June 3, 1879.

*To all whom it may concern:*

Be it known that I, JOHN HAGEN, of Little Sioux, in the county of Harrison and State of Iowa, have invented certai nnew and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the arrangement and combination of devices that will be more fully described hereinafter, whereby a planter is produced which can be readily managed, and which will automatically drop the corn at equal distances apart.

Figure 1 is a side elevation of my invention. Fig. 2 is a plan view of the same; and Figs. 3 and 4 are detail views of the same.

$a$ represents the two driving-wheels, which have the cog-wheels $b'$ secured to the inner ends of the hubs, and which wheels $b$ operate, as they revolve, the pinions $c$ on the ends of the shaft $d$. This shaft is journaled, near the rear end, on top of the frame $e$, that is, rigidly secured to the axle $f$, and the pinions are connected to the shaft by suitable ratchets, so that the shaft will not be operated when the machine is being backed. To this shaft, between the two pinions, is secured the beveled gear $g$, which meshes with the gear $h$ on the rear end of the shaft $i$. This shaft $i$ is journaled upon the frame $e$, and to its front end is fastened a short shaft, $j$, which serves to connect the shaft $i$ to the one $k$ on the front part of the machine, a universal joint being used at both ends of the shaft $j$, so that, no matter how rough the ground may be, or how much the front portion of the machine may be shaken or raised up, the dropping will go on as evenly and regularly as upon smooth ground.

The use of two universal joints, as here shown, is a great improvement over all similar devices heretofore used, for it allows both parts of the machine a much freer movement and more perfect action than can be attained in any other way, prevents them from cramping at any time, and prevents the front part from running deeper in some grounds than others.

As the box for the shaft $i$ at its rear end is movable, the two beveled wheels can be thrown out of gear, so as to stop the dropping while the machine is being turned around or driven to or from the field.

The shaft $k$ is journaled in suitable bearing upon the center of the front end of the machine, and has secured to it a cam, $l$, which revolves inside of a yoke, $m$, connected to the seed-slide $n$. As this cam revolves it moves the slide back and forth, and drops the grains of corn down into two separate tubes, $o$, in the large tubes $q$. Pivoted upon the rear sides of these tubes $q$ are the valve-rods $p$, which have their lower ends bent double, so as to reach up inside of the lower ends of the tubes $q$ and hold the valves $r$ up against the lower ends of the tubes $o$. As the upper ends of these rods $p$ catch in the feed-slide each time the slide moves, the valves are shifted from under the end of one tube to the other. To this shaft $k$, back of the cam, is fastened the rod or arm $s$, to the ends of which are fastened the perforated adjustable plates $t$. These plates can be so adjusted as to extend any suitable distance beyond the ends of the rod or arm, so as to mark shallow or deep, and serve to mark the places where the corn is dropped.

This rod, it will be seen, is placed at right angles to the greatest width of the cam, so that by the time the machine has moved forward far enough after dropping the grains of corn for the rod to be just opposite to them one end of the rod marks the place where the hills are.

It will be obvious that in practice the height of the machine should be in such proportion to the width that the arms of the marker can strike the ground, and yet swing clear of the hoppers.

The frame of the rear part of the machine is fastened to the frame $u$ of the front part by means of the screw-rods $v$ and links $w$, the rods $v$ being screwed into the front ends of the frame $e$, so as to make the distance between the two parts of the machine vary at the will of the operator. This adjustable coupling is a great convenience in a great many places, for it enables the machine to be coupled long or short, according to the condition of the ground.

To the rear end of the frame $u$ is secured the extension $x$, and to the rear end of this extension is fastened the operating-lever $y$, by means of which the driver can raise and lower the rear ends of the furrow-openers, and thus cause them to run shallow or deep.

In starting the machine at the beginning of a row the bevel-gear is thrown out of contact with the other gear by means of a lever which is connected to the sliding box, and which lever reaches up within easy reach of the driver. As soon as these wheels are thrown out of gear the dropping mechanism at once stops, and then the driver can move his machine into position, where the next hill will be formed exactly in line with the others. When it is attempted to operate this dropping mechanism directly from the axle, as has heretofore been the case, the irregularity of the movement of the axle makes the dropping so uneven that it is impossible to make the machine operate satisfactorily. Should one of the wheels strike against an obstruction the revolution of the axle is checked, the dropping mechanism subjected to a strain, and the regularity of the motion interfered with.

All these objections I overcome by the use of an additional shaft, as shown, and which is operated alike by both driving-wheels, so that should one wheel run against an obstruction the other wheel will continue to revolve and operate the seeding mechanism as though nothing had happened.

In order to lay off the ground at the same time that the planting is being done, there is pivoted on the front of the frame $u$ the tongue, to which is loosely fastened the long bent rod 1, which has the marker 2 upon its outer end. To this rod is loosely fastened the brace 3, which reaches back and is hooked upon the edge of the seat 4. When the driver gets to the end of the row he unhooks the brace from the seat, raises the marker up, and drops it over on the other side of the machine, where it is ready for operation again.

Having thus described my invention, I claim—

1. In a corn-planter, the combination of the front and rear frames, the links $w$, by which they are united, and the shafts $i\ j\ k$, the shaft $k$ being provided with the cam $l$ for operating the seed-slide, substantially as described.

2. In a corn-planter, the longitudinally-geared shaft $k$, provided with the revolving marking arm or rod $s$, which is placed at right angles to the widest part of the cam, substantially as set forth.

3. The combination of the shaft $k$, rod $s$, and adjustable plates $t$, the rod being made to revolve in between and slightly in the rear of the seed-boxes, and to mark in between the hills of corn, substantially as specified.

4. In a corn-planter in which the frame is made in two parts, the screw-rods $v$ and links $w$, in combination with the extension $x$ and lever $y$, substantially as shown.

5. In a seed-planter, the combination of the tubes $q$, having the two tubes $o$, and having their lower ends closed by partitions or plates which have a perforation for each tube, with the seed-slide $n$ and levers $p$, which have their lower ends turned upward into the tubes $q$, and provided with valves $r$, that alternately close the ends of the tubes $o$, substantially as shown.

In testimony that I claim the foregoing I have hereunto set my hand this 23d day of May, 1879.

JOHN HAGEN.

Witnesses:
GEO. F. STRAIT,
A. B. M. ELLIS.